(12) United States Patent
Schaller

(10) Patent No.: US 11,078,817 B2
(45) Date of Patent: Aug. 3, 2021

(54) TECHNIQUE FOR COLLECTING AND MEASURING OIL DRAINED FROM A VEHICLE

(71) Applicant: Arthur D. Schaller, Avon, CT (US)

(72) Inventor: Arthur D. Schaller, Avon, CT (US)

(*) Notice: Subject to any disclaimer, the term of this patent is extended or adjusted under 35 U.S.C. 154(b) by 0 days.

(21) Appl. No.: 15/986,288

(22) Filed: May 22, 2018

(65) Prior Publication Data

US 2018/0334936 A1    Nov. 22, 2018

Related U.S. Application Data

(60) Provisional application No. 62/509,504, filed on May 22, 2017, provisional application No. 62/674,721, filed on May 22, 2018.

(51) Int. Cl.
| | |
|---|---|
| *F01M 11/04* | (2006.01) |
| *F01M 11/12* | (2006.01) |
| *F16N 31/02* | (2006.01) |

(52) U.S. Cl.
CPC ............ *F01M 11/04* (2013.01); *F01M 11/12* (2013.01); *F16N 31/02* (2013.01); *F16N 2230/18* (2013.01); *F16N 2250/18* (2013.01); *F16N 2280/00* (2013.01)

(58) Field of Classification Search
None
See application file for complete search history.

(56) References Cited

U.S. PATENT DOCUMENTS

| | | | | |
|---|---|---|---|---|
| 206,946 | A * | 8/1878 | Hitchcock | B67D 7/348 141/94 |
| 216,530 | A * | 6/1879 | Pfitzenmeier | B67D 7/348 141/94 |
| 486,762 | A * | 11/1892 | Camden | A47J 31/44 141/341 |
| 4,114,660 | A * | 9/1978 | Arruda | B67C 11/04 141/339 |
| 4,976,297 | A * | 12/1990 | Peckels | B67C 11/02 116/109 |

(Continued)

*Primary Examiner* — Daphne M Barry
(74) *Attorney, Agent, or Firm* — Ware, Fressola, Maguire & Barber LLP

(57) ABSTRACT

Apparatus for collecting and measuring oil drained from a vehicle includes a receptacle and a valve. The receptacle includes a wide upper oil collection portion with an upper receptacle wall configured to collect and contain oil drained from a vehicle, and includes a narrower lower outlet portion having a lower receptacle wall configured to allow the oil to drain from the receptacle via a gravity feed. The receptacle has markings arranged on at least one of the upper receptacle wall or the lower receptacle wall and configured to measure the oil drained and collected from the vehicle. The valve includes an upper valve inlet and coupling portion configured to connect to the narrower lower outlet portion of the receptacle and allow the oil to drain into the valve, includes a valve opening/closing portion configured either to open and allow the oil to drain through the valve or to close and allow oil to collect in the receptacle, and includes a lower valve outlet and coupling portion configured to connect to a tube or oil basin/reservoir to allow the oil to drain from the valve into the tube or oil basin/reservoir.

16 Claims, 5 Drawing Sheets

(56) References Cited

U.S. PATENT DOCUMENTS

| | | | | |
|---|---|---|---|---|
| 5,375,862 | A * | 12/1994 | Sirianno | B62B 3/00 |
| | | | | 141/88 |
| 5,381,839 | A * | 1/1995 | Dowd | B65B 3/30 |
| | | | | 141/237 |
| 5,407,177 | A * | 4/1995 | Lombardo | F01M 11/0408 |
| | | | | 184/1.5 |
| 6,837,283 | B1 * | 1/2005 | Wegner | B65B 39/02 |
| | | | | 141/338 |
| 8,387,455 | B1 * | 3/2013 | Kaminski | G01F 23/266 |
| | | | | 73/304 C |
| 2008/0295915 | A1 * | 12/2008 | Kim | F01M 11/0408 |
| | | | | 141/98 |
| 2016/0130042 | A1 * | 5/2016 | Gascoine | B65D 41/04 |
| | | | | 206/438 |
| 2016/0185585 | A1 * | 6/2016 | Lin | B67C 11/02 |
| | | | | 141/331 |
| 2018/0185868 | A1 * | 7/2018 | Bauck | B67D 7/22 |
| 2020/0049037 | A1 * | 2/2020 | Schaller | F01M 11/0408 |

\* cited by examiner

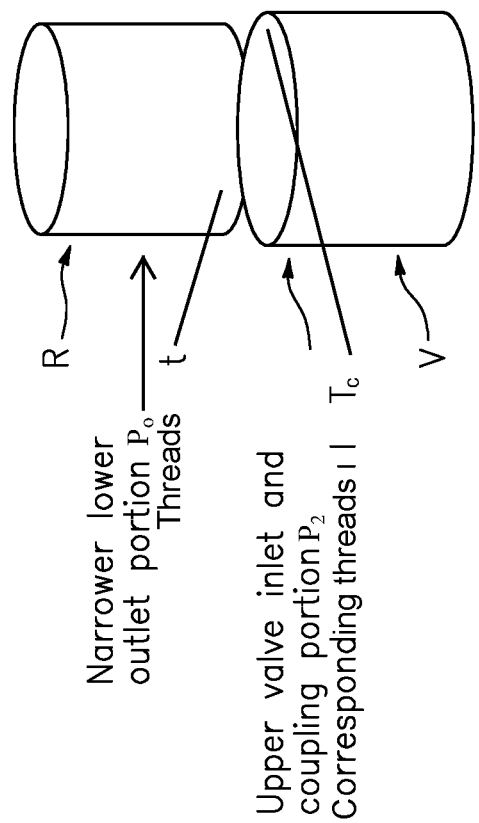
FIG. 3: Example of a Receptacle/Valve Connection/Coupling

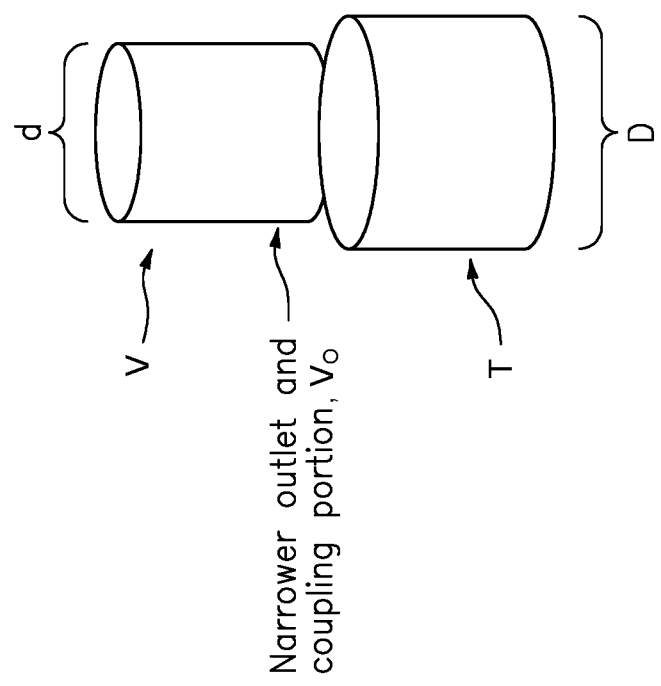
FIG. 4: Example of a Valve/Tube Connection

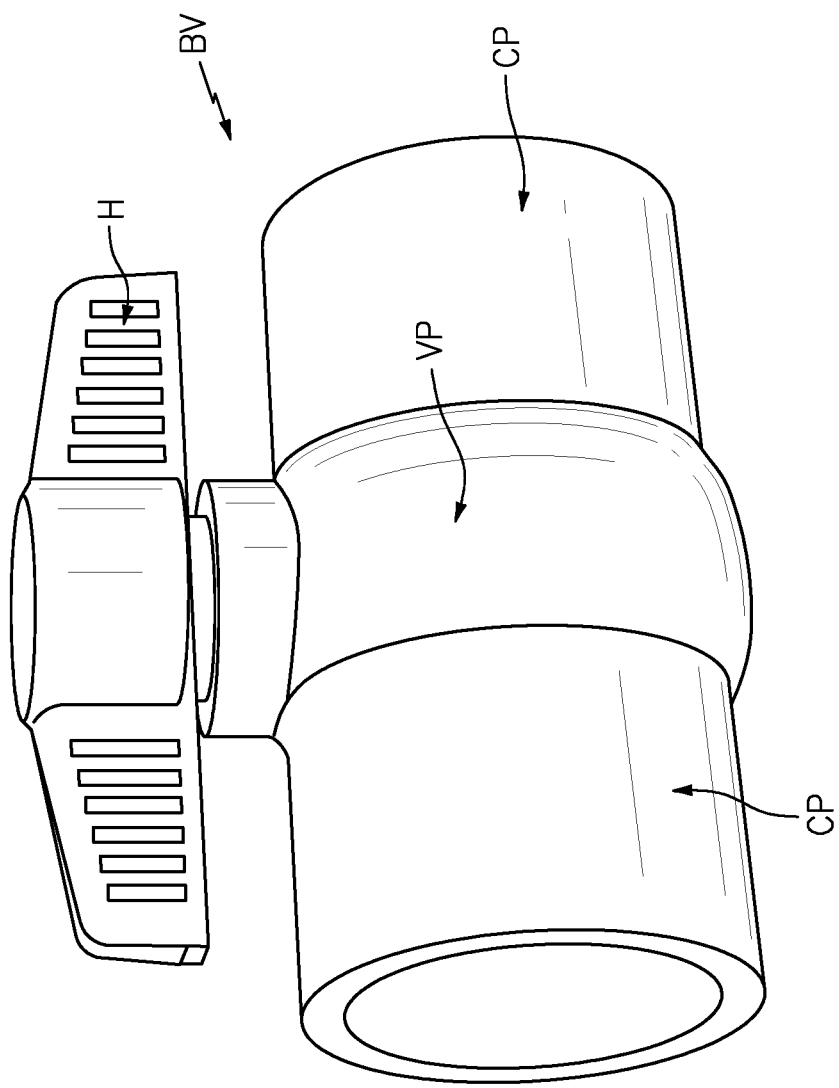
*FIG. 5* : Example of Ball Valve

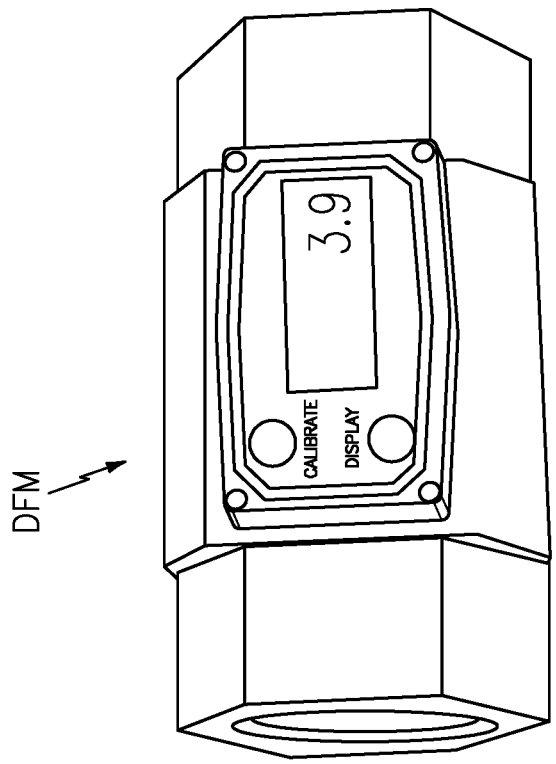
FIG. 6B: Example of Digital Flow Meter
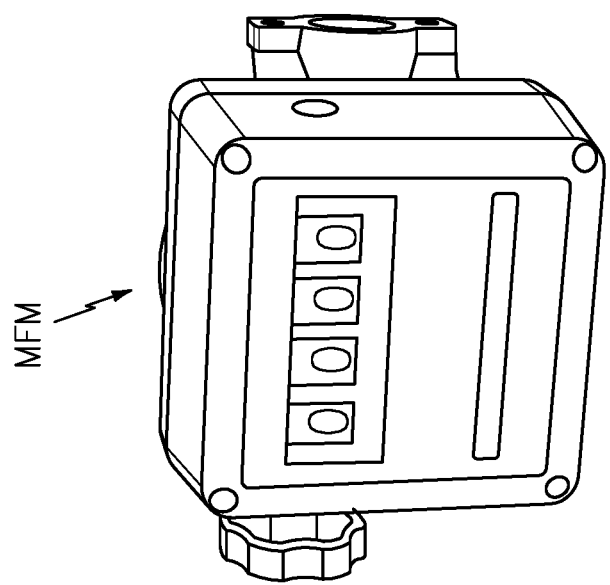
FIG. 6A: Example of Mechanical Flow Meter

TECHNIQUE FOR COLLECTING AND MEASURING OIL DRAINED FROM A VEHICLE

CROSS-REFERENCE TO RELATED APPLICATIONS

This application claims benefit to provisional patent application Ser. No. 62/509,504, filed 22 May 2017, as well as provisional patent application Ser. No. 62/674,721, filed 22 May 2018, which are both hereby incorporated by reference.

BACKGROUND OF THE INVENTION

1. Field of the Invention

This application relates to a technique for collecting and measuring oil drained from a vehicle.

2. Description of Related Art

In the prior art, when a motorist has their oil changed, a technician typically drains the oil from the motorist's vehicle into an oil basin, e.g., without having any idea how much oil was drained from the consumer's vehicle. Most technicians do not even check the dip stick to determine the amount of oil in the motor.

As one skilled in the art would appreciate, when vehicles are operated during normal use, engines burn or consume oil. Moreover, oil may leak from an engine. As vehicles get older, many times the motorist's vehicle can lose multiple quarts of oil between oil changes, which many times results in the vehicle being driven with an insufficient amount of oil, e.g., which is well below the recommended oil level specification for the vehicle.

By way of example, driving a vehicle with an insufficient amount of oil may cause damage to the vehicle when being operated, including damage to engine parts/components (e.g., rings) from the dirty oil concentrated in the smaller remaining quantity of oil, as well as damage from the vehicle running at much hotter temperatures than it otherwise should be running based upon recommended temperature operating specification for the vehicle.

The present invention provides a solution to this problem in the art.

SUMMARY OF THE INVENTION

According to some embodiments, the present invention may include, or take the form of, apparatus for collecting and measuring oil drained from a vehicle includes a receptacle and a valve.

The receptacle may include a wide upper oil collection portion with an upper receptacle wall configured to collect and contain oil drained from a vehicle, and may also include a narrower lower outlet portion having a lower receptacle wall configured to allow the oil to drain from the receptacle via a gravity feed. The receptacle may include markings arranged on at least one of the upper receptacle wall or the lower receptacle wall and configured to measure the oil drained and collected from the vehicle.

The valve may include an upper valve inlet and coupling portion configured to connect to the narrower lower outlet portion of the receptacle and allow the oil to drain from the narrower lower outlet portion into the valve, may include a valve opening/closing portion configured either to open and allow the oil to drain through the valve or to close and allow oil to collect in the receptacle, and may also include a lower valve outlet and coupling portion configured to connect to a tube or oil basin/reservoir to allow the oil to drain from the valve into the tube or oil basin/reservoir.

The apparatus may include one or more of the following features:

The Markings

The upper receptacle wall may include ½ quart markings configured to measure the oil drained and collected from the vehicle in ½ quart increments; the lower receptacle wall may include ½ quart markings configured to measure the oil drained and collected from the vehicle in ½ quart increments, or both may include ½ quart markings configured to measure the oil drained and collected from the vehicle in ½ quart increments. Embodiments are envisioned, and the scope of the invention is intended to include, using other types or kinds of markings either now known or later developed in the future, e.g., including ⅛ or ¼ quart markings, as well as metric-based markings, such as ⅛, ¼ or ½ liter markings. In other words, the scope of the invention is not intended to be limited to the type, kind, dimension, etc. of the markings.

The Receptacle

The receptacle may include a funnel, e.g., including a funnel having an upper portion that is wide at the top and a lower portion that is narrow at the bottom for guiding the oil into a smaller lower outlet opening.

At least part of the receptacle may include a translucent material, including where the translucent material forms at least part of the upper receptacle wall or the lower receptacle wall. As one skilled in the art would appreciate, translucent materials are understood to be semi-transparent materials, e.g. that allow light, but not necessarily detailed images, to pass through.

At least part of the receptacle may include a "see-though" material, including at least part of the upper receptacle wall or the lower receptacle wall. As one skilled in the art would appreciate, "see-though" materials are understood to be transparent materials, e.g. that allow light, as well as detailed images, to pass through.

The Valve

The valve opening/closing portion may include a handle configured to turn, open and allow the oil to drain through the valve, and also configured to turn, close, not allow oil to pass through the valve, but to allow the oil to collect in the receptacle.

The valve opening/closing portion may include an electronic switch configured to respond a pressing/switching force applied by a user, and either open and allow the oil to drain through the valve, or close, not allow oil to pass through the valve, but to allow the oil to collect in the receptacle.

The valve opening/closing portion may include an electronic switch configured to respond wireless signaling and either open and allow the oil to drain through the valve, or close, not allow oil to pass through the valve, but to allow the oil to collect in the receptacle.

The valve may include an oil measuring portion configured to respond to the oil draining through the valve, and provide oil measurement signaling containing information about the amount of oil draining from the receptacle and through the valve, e.g., including where the valve has a display (e.g., an LED display) and the oil measurement signaling is displayed on the display.

The valve may be a ball valve.

The Receptacle/Valve and/or Valve/Tube/Basin Connections

The narrower lower outlet portion of the receptacle and the upper valve inlet and coupling portion may be configured to connect together using a connection, including where the narrower lower outlet portion of the receptacle has a narrow portion configured to fit into a corresponding wider portion of the upper valve inlet and coupling portion. Alternatively, the upper valve inlet and coupling portion of the valve and the narrower lower outlet portion of the receptacle may be configured to connect together using a threaded connection with corresponding openings having threads.

The lower valve outlet and coupling portion and the tube or oil basin/reservoir may be configured to connect together using a corresponding connection, including where the lower valve outlet and coupling portion has a corresponding narrow portion having a diameter d configured to fit into a corresponding wider portion having a diameter D of the tube or oil basin/reservoir, where diameter D is greater than diameter d. Alternatively, the lower valve outlet and coupling portion and the tube or oil basin/reservoir may be configured to connect together using a threaded connection with corresponding openings having threads.

Other Embodiments

The apparatus also may include embodiments that include the tube and the oil basin/reservoir.

Advantages

Advantages of the present invention may include one or more of the following:

The present invention allows the vehicle technician to be more proactive in visually spotting oil consumption problems in vehicles.

Moreover, the present invention may also be used to facilitate oil consumption testing, e.g., requested by a vehicle manufacturer in cases where a vehicle appears to be losing oil in a manner inconsistent with the vehicle's design specifications.

BRIEF DESCRIPTION OF THE DRAWING

The drawing includes FIGS. 1-6B, which are not necessarily drawing to scale, as follows:

FIG. 3 shows an example of a receptacle/valve connection, according to some embodiments of the present invention.

FIG. 4 shows an example of a valve/tube connection, according to some embodiments of the present invention.

FIG. 5 shows a view of a ball valve, according to some embodiments of the present invention.

FIG. 6A shows a view of a mechanical flow meter, according to some embodiments of the present invention.

FIG. 6B shows a view of a digital flow meter, according to some embodiments of the present invention.

DETAILED DESCRIPTION OF THE PRESENT INVENTION

Figure 1:
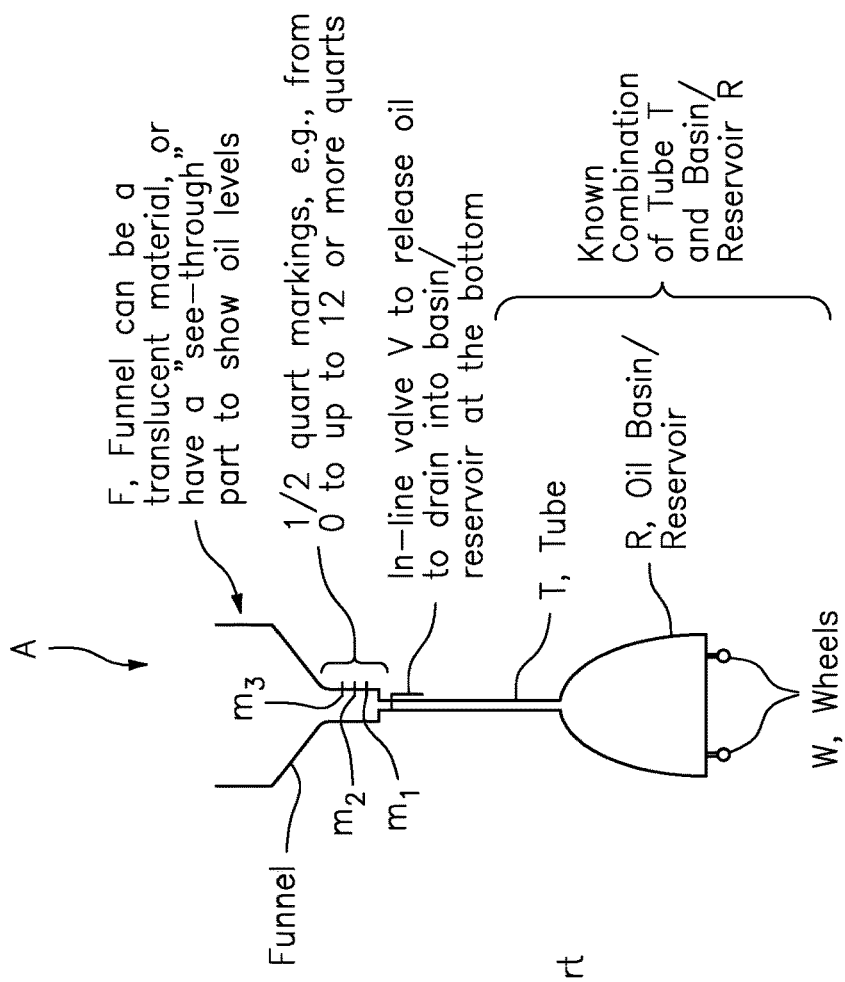
FIG. 1 shows the present invention in the form of a collection, measuring or receptacle device for receiving, collecting and measuring oil drained from a vehicle during an oil change, e.g., which looks like a funnel going into a "measuring cup" before entering a tube that goes to a receptacle (e.g., oil basin) at the bottom.

In summary, the apparatus/device disclosed herein is a new adaptation on a top portion (not shown) of an oil drain bucket that is currently known and used in the art, which includes the combination of an oil basin/reservoir and a tube as shown in FIG. 1, e.g., where the top portion (not shown) simply catches the oil and allows it to drain into the oil basin/reservoir below. This known combination is used in service stations that do oil changes throughout the United States and worldwide.

Figure 2:
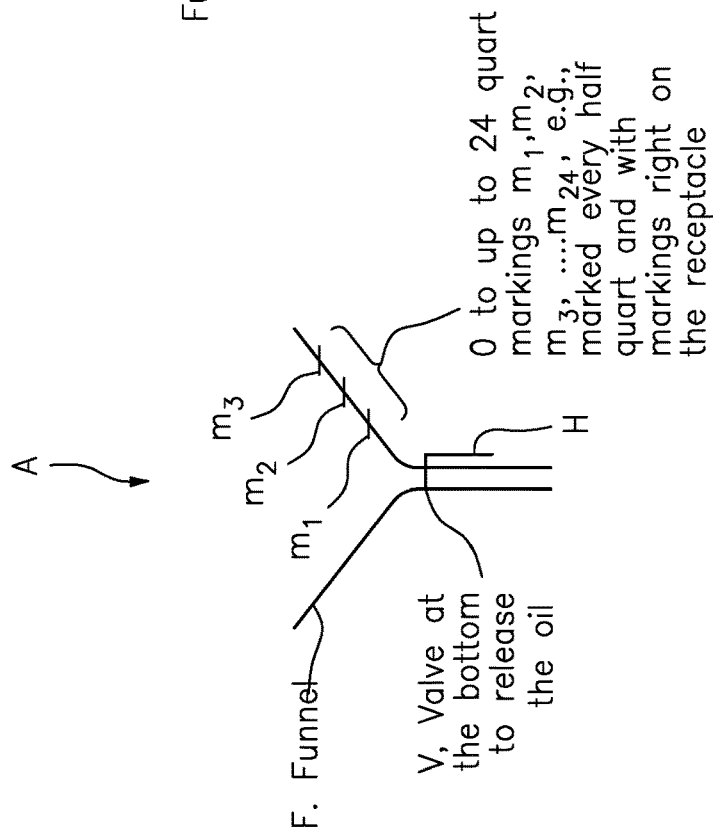
FIG. 2 shows the "measuring cup" portion (e.g., with the tube and oil basin cut out) and incorporates the measuring function into the basic design. This is more reflective of just adding the measuring function and the valve.

According to the present invention, a new and unique apparatus generally indicated as A has a new funnel or funnel section F that is created and configured at the top of the oil drain bucket, e.g., as shown in FIGS. 1 and 2. By way of example, this new and unique funnel section F may be made from a translucent or light colored plastic to allow the technician to see the amount of oil drained from the vehicle. This new and unique funnel section F has a valve V as shown configured at the bottom of the funnel to prevent oil (not shown) from going down the tube T and into the collection basin/reservoir R at the bottom, but instead to collect in the funnel section F. The valve V may include a handle portion H, e.g., for turning the valve into open and closed positions. By way of example, the valve V may take the form of a ball valve, e.g., which is known in the art. The oil basin/reservoir R may include wheels W for moving the apparatus A around the service station floor. In effect, the oil would be collected in the funnel F. Moreover, the funnel F includes measuring indicators (or markings) $m_1, m_2, m_3$ that identify (or measure) the amount of oil that is collected in the funnel F so the technician (or anyone changing a car's oil) is able to identify the amount of oil that drained or came out of the engine/oil pan, e.g., 1 QT., 2 QTs., 3 QTs., 4 QTs, etc. Embodiments are envisioned, and the scope of the invention is intended to include, using markings to identify 12 QTs or more, e.g., drained from larger vehicles, heavy equipment, etc.

By way of example, see examples of funnels shown in FIGS. 1 and 2 of the aforementioned patent application Ser. No. 62/674,721.

This new apparatus A having the funnel device F will help in diagnosing oil consumption problems by providing a fast and convenient way for technicians to measure the oil that came out of the car while performing an oil change. This diagnosis will put the technician and hence the motorist on notice that the vehicle being serviced was being driven with an insufficient amount of oil, e.g., which allows the motorist to take measures to address the insufficient oil problem so as to prevent any further damage to the vehicle when being operated, including damage to engine parts/components from the dirty oil concentrated in the smaller remaining quantity of oil, as well as damage from the vehicle running at much hotter temperatures than it otherwise should be running.

In addition, the service station may log the amount of oil drained from the vehicle at each oil change, and collect information for trending oil consumption over time. This logging and collecting of information will put the technician and hence the motorist on notice that the vehicle being serviced is consistently losing a certain amount of oil over time, which again also allows the motorist to take measures to address the insufficient oil problem so as to prevent any further damage to the vehicle when being operated.

In effect, the present invention provides a quick and easy way to measure and collect the levels of oil being drained, which will help the technician and motorist to take remedial steps to avert damage cause to the vehicle by having an insufficient and/or steadily decreasing amount of oil for lubricating their vehicle engine.

FIG. 3: Example of a Receptacle/Valve Connection

By way of example, FIG. 3 shows an example of a receptacle/valve connection, where a narrower lower outlet portion $P_o$ of the receptacle R and an upper valve inlet and coupling portion Pi of the valve V may be configured to mechanically connect together, e.g., using a suitable mechanical connection or coupling technique, including where the narrower lower outlet portion $P_o$ of the receptacle R has a narrow portion configured to fit into and mechanically engage a corresponding wider portion of the upper valve inlet and coupling portion Pi of the valve V. For example, in cases where the receptacle R and the valve V are made of a plastic or thermoplastic material, the suitable mechanical connection may include, or take the form of, a plastic welding, which is known in the art. The plastic welding may including a three step process, e.g., such as that known as ISO 472, including surface preparation, application of a heat and pressure, and cooling. By way of further example, in cases where the receptacle R and the valve V are made of a metallic material, the suitable mechanical connection may include, or take the form of, a metallic welding process, which is known in the art.

Alternatively, the narrower lower outlet portion of the receptacle R and the upper valve inlet and coupling portion of the valve V may be configured to connect together using a threaded connection having corresponding threads t, T like that shown in FIG. 3.

Alternatively, the narrower lower outlet portion of the receptacle R may include, or take the form of, a tapered or conically descending portion, and the upper valve inlet and coupling portion of the valve V may be configured or dimensioned to receive the tapered or conically descending portion of the receptacle R. In effect, the upper valve inlet and coupling portion of the valve V may be configured or dimensioned to be slightly wider than the narrower lower outlet portion of the receptacle so as to receive and engage the tapered or conically descending portion of the receptacle R.

Alternatively, the lower outlet portion of the receptacle R may be configured or dimensioned to be slightly wider than the upper valve inlet and coupling portion of the valve V, e.g., so that the lower outlet portion of the receptacle R fits over, engages and rests on the upper valve inlet and coupling portion of the valve V. In this case, the lower valve outlet and coupling portion of the valve V may be configured with a stop (not shown) extending outwardly on which the lower outlet portion of the receptacle R may rest.

The aforementioned receptacle/valve connections are provided by way of example, and the scope of the invention is not intended to be limited to any particular type or kind of receptacle/valve connection either now known or later developed in the future, as would be appreciated by one skilled in the art.

FIG. 4: Example of a Valve/Tube Connection

By way of example, FIG. 4 shows an example of a valve/tube connection, where a lower valve outlet and coupling portion $V_o$ of the valve V and the tube T or oil basin/reservoir may be configured to connect together using a corresponding mechanical connection, including where the lower valve outlet and coupling portion $V_o$ of the valve V has a corresponding narrow portion having a diameter d configured to fit into a corresponding wider portion having a diameter D of the tube T or oil basin/reservoir, where diameter D is greater than diameter d.

Alternatively, the lower valve outlet and coupling portion $V_o$ of the valve V and the tube T or oil basin/reservoir may be configured to connect together using a threaded connection with corresponding threads like t, $T_c$ shown in FIG. 3.

Alternatively, the lower valve outlet and coupling portion of the valve V may include, or take the form of, a corresponding tapered or conically descending portion, and the tube T or oil basin/reservoir may be configured or dimensioned to receive the corresponding tapered or conically descending portion. In effect, the lower valve outlet and coupling portion of the valve V may be configured or dimensioned to be slightly narrower than the tube T or oil basin/reservoir, so that the corresponding tapered or conically descending portion fits into the tube T or oil basin/reservoir. In this case, the lower valve outlet and coupling portion of the valve V may be configured with a stop (not shown) extending outwardly for resting on the upper lip of the tube T or oil basin.

Alternatively, the lower valve outlet and coupling portion of the valve V may be configured or dimensioned to be slightly wider than the tube T or oil basin/reservoir, so that the lower valve outlet and coupling portion of the valve V fits over, engages and rests on the tube T or oil basin/reservoir, e.g., where diameter d is greater than diameter D in FIG. 4. In this case, the tube T or oil basin/reservoir may be configured with a stop (not shown) extending outwardly on which the lower valve outlet and coupling portion of the valve V may rest.

The aforementioned valve/tube connections are provided by way of example, and the scope of the invention is not intended to be limited to any particular type or kind of valve/tube connection either now known or later developed in the future, as would be appreciated by one skilled in the art.

The Valve

The scope of the invention is not intended to be limited to any particular type or kind of valve configured in or on the funnel according to the present invention, and may include valves both now known and later developed in the future. By way of example, the valve according to the present invention may include a quick release mechanism to allow the technician to drain the oil after taking the measurement.

By way of further example, see an example of a ball valve shown in the aforementioned patent application Ser. No. 62/674,721.

By way of still further example, the valve may take the form of a ball valve, e.g., including but not limited to ball valves disclosed in one or more of the following U.S. Pat. Nos. 3,934,606; 3,934,849; 3,943,959; 3,948,480; 3,949, 965; 3,960,363; 3,970,106; 3,970,285; 3,985,150; 3,985,334; 3,985,335; 4,004,776; 4,020,864; 4,061,307; 4,068,822; 4,071,220; 4,076,211; 4,103,865; 4,103,867; 4,137,936, as well as U.S. Pat. Nos. 9,534,696; 9,593,779; 9,964,219, which are all incorporated by reference in their entirety. The present application also incorporates by reference all of the issued US patents and US patent publications disclosed in the aforementioned U.S. patent nos.

Vehicle

The term "vehicle" is intended to include any type or kind of machine that transports people or cargo, e.g., including but not limited to motor vehicles (such as motorcycles, cars, trucks, buses, etc.), railed vehicles (such as trains, trams, etc.,), watercraft (such as ships, boats, etc.), aircraft (such as planes, helicopters, etc.), as well as spacecraft. Moreover, the scope of the invention is not intended to be limited to the type or kind of vehicle from which the oil is drained.

Oil

The term "oil" is intended to include any type or kind of lubricating liquid used for operating a vehicle. Moreover, the scope of the invention is not intended to be limited to the type or kind of oil being drained and collected.

The Scope of the Invention

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. Apparatus for collecting and measuring oil drained from a vehicle, comprising:
   a receptacle having a wide upper oil collection portion with an upper receptacle wall configured to collect and contain oil drained from a vehicle, and having a narrower lower outlet portion with a lower receptacle wall configured to allow the oil to drain from the receptacle via a gravity feed, the receptacle having markings arranged on at least one of the upper receptacle wall or the lower receptacle wall and configured to measure the oil drained and collected from the vehicle and provide a visual indication of the oil collected and contained in the receptacle; and
   a valve having an upper valve inlet and coupling portion configured to connect to the narrower lower outlet portion of the receptacle and allow the oil to drain from the narrower lower outlet portion into the valve, having a valve opening/closing portion configured either to open and allow the oil to drain through the valve or to close and allow oil to collect in the receptacle, having a lower valve outlet and coupling portion configured to connect to a tube or oil basin/reservoir to allow the oil to drain from the valve into the tube or oil basin/reservoir, and having an oil measuring portion and a display, configured to respond to the oil draining through the valve, and provide oil measurement signaling containing information about the amount of oil draining from the receptacle and through the valve that is emitted from the display as an electronic visual indication in addition to the visual indication provided by the markings on the receptacle.

2. Apparatus according to claim 1, wherein the upper receptacle wall comprises ½ quart markings configured to measure the oil drained and collected from the vehicle in ½ quart increments.

3. Apparatus according to claim 1, wherein the lower receptacle wall comprises ½ quart markings configured to measure the oil drained and collected from the vehicle in ½ quart increments.

4. Apparatus according to claim 1, wherein the upper receptacle wall comprises at least some of the ½ quart markings configured to measure the oil drained and collected from the vehicle in ½ quart increments; and the lower receptacle wall comprises some other ½ quart markings configured to measure the oil drained and collected from the vehicle in ½ quart increments.

5. Apparatus according to claim 1, wherein the receptacle comprises a funnel, including an upper portion that is wide at the top and a lower portion that is narrow at the bottom for guiding the oil into a smaller lower outlet opening.

6. Apparatus according to claim 1, wherein at least part of the receptacle comprises a translucent material, including at least part of the upper receptacle wall or the lower receptacle wall.

7. Apparatus according to claim 1, wherein at least part of the receptacle comprises a "see-though" material, including at least part of the upper receptacle wall or the lower receptacle wall.

8. Apparatus according to claim 1, wherein the valve opening/closing portion comprises a handle configured to turn, open and allow the oil to drain through the valve, and also configured to turn, close and allow the oil to collect in the receptacle.

9. Apparatus according to claim 1, wherein the valve opening/closing portion comprises an electronic switch configured to respond to wireless signaling and either open and allow the oil to drain through the valve, or close and allow the oil to collect in the receptacle.

10. Apparatus according to claim 1, wherein the narrower lower outlet portion of the receptacle and the upper valve inlet and coupling portion are configured to connect together using a connection, including where the narrower lower outlet portion of the receptacle has a narrow portion configured to fit into a corresponding wider portion of the upper valve inlet and coupling portion.

11. Apparatus according to claim 1, wherein the lower valve outlet and coupling portion and the tube or oil basin/reservoir are configured to connect together using a connection, including where the lower valve outlet and coupling portion has a narrow portion configured to fit into a corresponding wider portion of the tube or oil basin/reservoir.

12. Apparatus according to claim 1, wherein the upper valve inlet and coupling portion and the narrower lower outlet portion of the receptacle are configured to connect together using a threaded connection with corresponding openings having threads.

13. Apparatus according to claim 1, wherein the lower valve outlet and coupling portion and the tube or oil basin/reservoir are configured to connect together using a threaded connection with corresponding openings having threads.

14. Apparatus according to claim 1, wherein the valve comprises a ball valve.

15. Apparatus according to claim 1, wherein the apparatus comprises the tube or oil basin/reservoir.

16. Apparatus according to claim 1, wherein the display is a Light Emitting Diode (LED) display configured to provide a digital visual indication.

* * * * *